Figure 1:
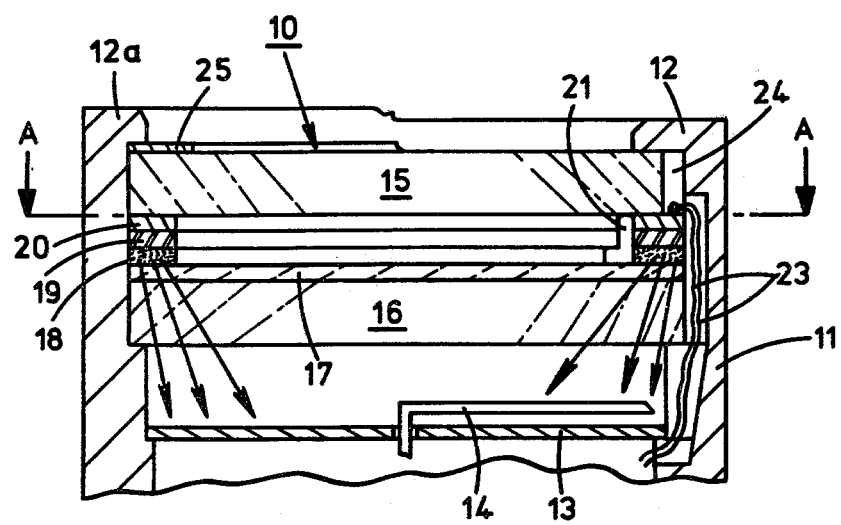

United States Patent [19]

Burrows et al.

[11] 4,181,925
[45] Jan. 1, 1980

[54] TRANSPARENT INSTRUMENT COVER AND INSTRUMENT INCORPORATING SAME

[75] Inventors: Kenneth Burrows; Robert Hiscutt, both of Birmingham, England

[73] Assignee: Saunders-Roe Developments Limited, Hayes, England

[21] Appl. No.: 816,683

[22] Filed: Jul. 18, 1977

[30] Foreign Application Priority Data

Jul. 19, 1976 [GB] United Kingdom ............... 30039/76

[51] Int. Cl.$^2$ ........................ G01D 11/28; F21V 9/16
[52] U.S. Cl. ........................................ 362/29; 362/23; 362/62; 362/84
[58] Field of Search ....................... 362/23, 27, 28, 29, 362/30, 34, 84

[56] References Cited

U.S. PATENT DOCUMENTS

| | | | |
|---|---|---|---|
| 2,908,806 | 10/1959 | Cohen | 362/84 X |
| 3,027,668 | 4/1962 | Hardesty | 362/23 X |
| 3,069,509 | 12/1962 | Sherron | 362/84 X |

FOREIGN PATENT DOCUMENTS

| | | | |
|---|---|---|---|
| 567330 | 12/1958 | Canada | 362/23 |
| 722972 | 12/1965 | Canada | 362/30 |
| 799142 | 8/1958 | United Kingdom | 362/23 |
| 1009933 | 11/1965 | United Kingdom | 362/84 |

Primary Examiner—Fred L. Braun
Attorney, Agent, or Firm—Larson, Taylor and Hinds

[57] ABSTRACT

A transparent instrument cover provided with an electroluminescent area arranged so that when energized, light is projected from one surface of the cover to illuminate a dial of an instrument on which it is fitted. The cover is intended as a replacement for an existing transparent cover or coverglass in an instrument. In a first embodiment the electroluminescent area is an annular area located adjacent the periphery of the cover, and in a second embodiment an isolated electroluminescent area is located within the annular area.

8 Claims, 4 Drawing Figures

TRANSPARENT INSTRUMENT COVER AND INSTRUMENT INCORPORATING SAME

This invention relates to transparent instrument covers that are used in instruments having a dial or facia bearing legends or characters that are viewed through, and protected by, the cover, and also to instruments incorporating such covers. More particularly the invention is concerned with such a transparent cover for an instrument in which it is desired to provide selective illumination of the dial or facia whereby the legends or characters are rendered visible in poor light conditions.

Conventionally, instrument dials, such as those of aircraft instruments, are illuminated by a plurality of electric bulbs either integral with the instrument or located at the ends of pillars extending from a front surface of an instrument panel in which the instruments are fitted. Depending on the size of the instrument, it is not unusual for five or more bulbs to be provided, and the resulting electrical power consumption can be of the order of 5 watts for each such instrument. This results in a problem of dissipating heat generated by the bulbs, and it has been calculated that the bulbs in an integrally lit instrument can account for up to 30 percent of the total heat generated in the instrument.

Operationally, bulb illumination may be unsatisfactory by providing an uneven light distribution that is also difficult to direct onto specific areas of the dial, and integrally illuminated instruments usually have to be provided with light transmitting and directing means in an attempt to overcome these problems thereby complicating design and manufacture and increasing costs. Furthermore, electric bulbs are unreliable and susceptible to damage by vibration and inertia shocks, resulting in a high level of maintenance activity. Integrally arranged bulbs therefore complicate instrument design, require an increased space envelope and increase the weight of an instrument, and these factors can preclude instruments of a small compact nature from being fitted with an integral illumination facility.

Pillar mounted bulbs are liable to external damage, and the pillars can obscure the instrument dials especially when viewed from an angle.

Accordingly, in one aspect, the present invention provides, in or for an instrument, a transparent cover including an area of electroluminescent material and means for connecting the area to an electrical supply, the electroluminescent area being arranged so that, when energised, light is projected from a surface of the cover to illuminate at least part of a dial of an instrument on which the cover is fitted.

The transparent cover according to this invention is intended to be fitted to an instrument in place of the conventional transparent cover, and may be fitted either as a replacement item to an existing instrument, or during initial manufacture of the instrument.

By an area of electroluminescent material we mean an area of phosphor material provided in a desired location on the transparent cover, the phosphor material when energised electrically being excited to luminescence so as to emit visible light.

Preferably the electroluminescent area is located between glass laminates secured together with a transparent adhesive, and comprises a first electrode layer, a layer of light emitting phosphor, an insulating layer and a second electrode layer.

The first electrode layer may comprise a transparent electrically conductive metal oxide film applied to an inner surface of one of the glass laminates, and the second electrode layer may comprise a copper film applied to the insulating layer.

In one embodiment of the invention, the electroluminescent area comprises an annular area located adjacent the periphery of the transparent cover and, in such an arrangement, a copper film strip may be connected to the first electrode layer and extended into a gap formed in the second electrode layer so that edges of the strip are spaced-apart from edges defining the gap in the second electrode layer.

In a further embodiment, the electroluminescent area includes a further area located within the annular area. In this embodiment the first electrode layer of the annular area may be common to both areas, and a second electrode layer of the further area may be connected through a transparent electrically conductive film strip applied to an inner surface of the one glass laminate to a copper film strip extending into a further gap in the second electrode layer of the annular area so that edges of the copper strip are spaced-apart from edges defining the further gap in the second electrode layer. Conveniently, the transparent electrically conductive film strip may be located in a gap in the transparent electrically conductive film forming the first electrode layer and is spaced-apart from edges defining the gap in the first electrode layer.

Electrically flying leads may be soldered to the copper film layer(s) and the copper film strip(s) and arranged for connection to an electrical supply to energise the first and second electrodes.

A layer of opaque material may be applied to an outer surface of the glass laminate that forms an external surface of the transparent cover so as to obscure the electroluminescent area from sight when the cover is viewed from the outer surface.

In another aspect, the invention provides an instrument having a dial provided with legend or characters to be viewed through a transparent cover, the cover including an annular area of electroluminescent material sandwiched between glass laminates and located adjacent the periphery of the cover, and means for connecting an electrical supply to the electroluminescent area so that, when energised, light is projected on to the dial whereby the legend or characters are rendered visible in poor light conditions.

Figure 2:
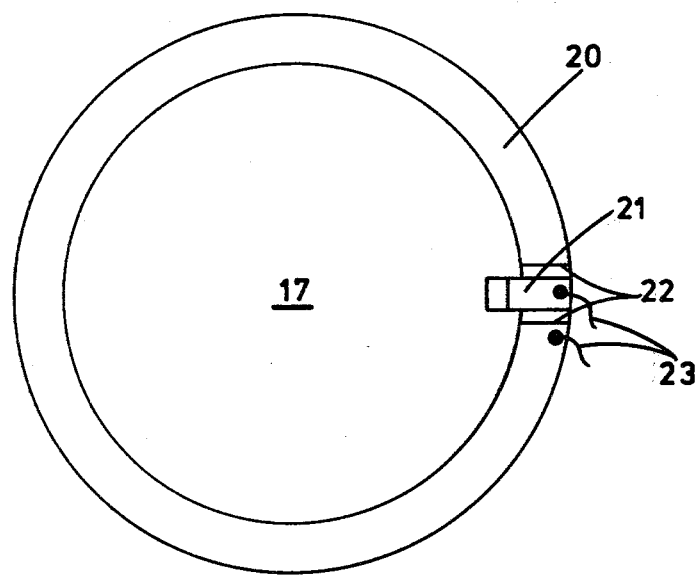
Figure 3:
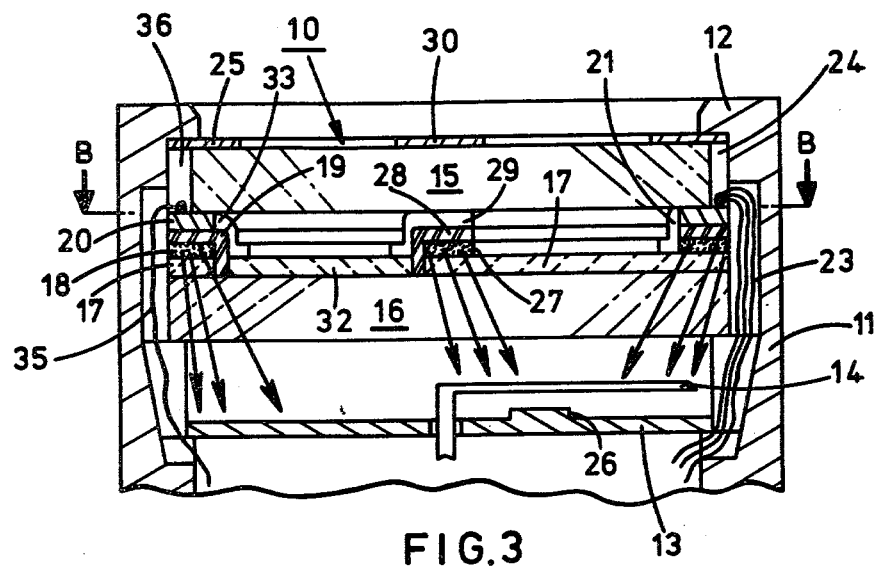
Figure 4:
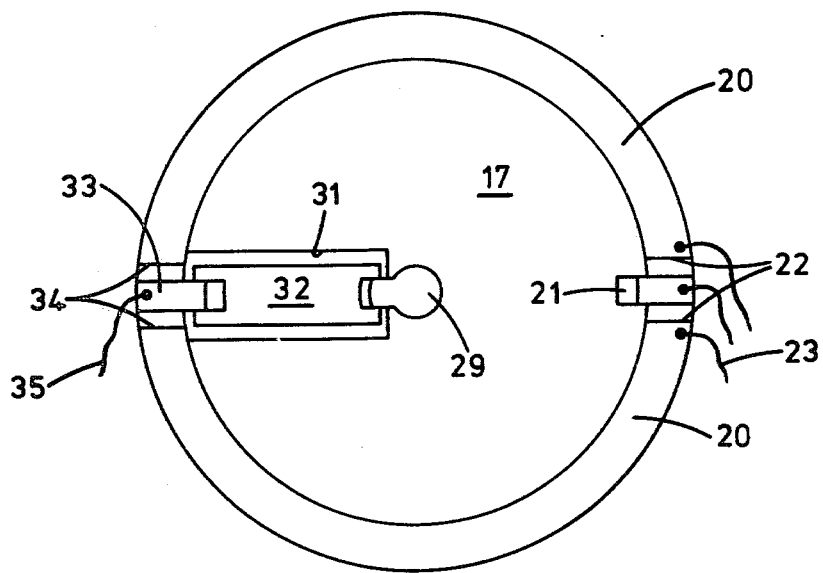

The invention will now be described by way of example only and with reference to the accompanying drawings, in which, FIG. 1 is a sectioned view of a transparent instrument cover constructed in accordance with one embodiment of the invention and incorporated in an instrument, FIG. 2 is a fragmentary view taken along lines A—A of FIG. 1, FIG. 3 is a sectioned view of a transparent instrument cover constructed in accordance with another embodiment of the invention, and incorporated in an instrument, and FIG. 4 is a fragmentary view taken along lines B—B of FIG. 3.

Referring now to FIG. 1, a transparent cover generally indicated at 10, is located in an instrument 11 and retained by a bezel 12 in a conventional manner above a dial 13 and rotatable pointer 14. The dial 13 includes legends or characters (not shown) that are swept by the pointer 14, and viewed through the transparent cover 10.

In practice, the transparent cover 10, now to be described, may have a total thickness of not more than 1.5 mm, so that it will be appreciated that the various constituent elements are shown enlarged many times for the purpose of clarifying the description.

The transparent cover 10 comprises a sealed sandwich construction having upper and lower circular flat glass laminates 15 and 16 respectively. A transparent electrically conductive tin oxide film 17 comprising a first electrode is provided on an inner surface of the lower glass laminate 16, and an annular layer of light emitting phosphor 18 dispersed in a resin binder overlies the layer 17 around the periphery of the laminate 16. An annular layer of high dielectric constant material 19 such as barium titanate overlies the phosphor layer 18, and an annular layer of copper 20 forming a second electrode is deposited on the insulating layer 19. A copper film strip 21 is located in a gap 22 (FIG. 2) in the annular copper layer 20 and spaced-apart from the edges thereof to isolate the two conductors, and is connected to the transparent conductive layer 17 as shown in FIG. 1. Electrical leads 23 are soldered to upper surfaces of the copper layer 20 and the copper strip 21, and are routed through the instrument 11 for connection to a 115 V, 400 Hz electrical supply.

The electric leads 23 are connected to a suitable socket (not shown) that may be provided either in the instrument 11 or externally thereof.

The transparent cover 10 is completed by the upper glass laminate 15 that is secured using a transparent adhesive (not shown). A local cut-out 24 is provided in the laminate 15 to clear the soldered connections of the electrical leads, and the cut-out 24 and peripheral edge of the cover 10 is sealed after the electrical connections have been made.

The right hand side of FIG. 1 depicts an instrument in which the bezel 12 is of sufficient dimension to obscure the annular electroluminescent area when the instrument is viewed through the transparent cover 10. The left hand side of FIG. 1 illustrates a bezel 12a that does not obscure the electroluminescent layer from sight so that an annular opaque layer 25 of matt black paint is provided on an outer surface of upper laminate 15 for this purpose.

The transparent cover 10 of FIGS. 3 and 4 is similar to that previously described in that it is shown as including an annular electroluminescent area, and like reference numerals are used to designate similar constituent parts. In addition, in this embodiment, a circular isolated electroluminescent area is located generally centrally of the cover 10 so as to illuminate a specific area 26 of the dial 13 that may, for example, comprise warning flags or rotating numerical counters. The isolated electroluminescent area is of similar construction to the previously described annular area, and comprises a phosphor layer 27, and insulating layer 28 and a copper layer 29. An opaque layer 30 is provided on an outer surface of laminate 15 to obscure the isolated electroluminescent area from outside the instrument 11.

From FIG. 4 it will be seen that, in this embodiment, the transparent layer 17 does not totally cover the surface of the laminate 16, but is provided with a generally rectangular cut-out 31 extending radially inwardly from a peripheral edge. A rectangular transparent electrically conductive film 32 is provided on the surface of the laminate 16 in the area enclosed by the cut-out 31, and is spaced-apart from the edges of the cut-out 31 to isolate the two conductors. The transparent layer 32 provides an electrical connection between the central copper layer 29 and a copper strip 33 located in a further cut-out 34 provided in the annular copper layer 20. A further electrical lead 35 is soldered to the copper strip 33 for connection to the electrical supply, and a local cut-out 36 is provided in the upper glass laminate 15 to clear the soldered connection.

The phosphor layers 18 and 27 in the respective electroluminescent areas are located between electrodes comprising the transparent layer 17, and the copper layers 20 amd 29 respectively. When activated by an electrical current, the phosphor layers 18 and 27 are excited to luminescence so that light is projected on to desired areas of the dial 13 as indicated by the arrows in FIGS. 1 and 3, thereby illuminating legends or characters on the dial so as to be readily visible in poor light conditions.

Thus, the transparent cover 10 of the present invention provides instrument dial illumination means in which light is provided precisely where it is required. In the embodiments illustrated this is shown as, respectively, around the periphery of the dial 13 (FIG. 1) that normally carries graduations and legends, and a combination of the periphery of the dial 13 and an isolated central area 26 (FIG. 3). The light provided by the electroluminescent area(s) of the transparent cover 10 is uniform and shadow-free, and efficient dimming can readily be accomplished by incorporating a voltage regulator in the electric circuit.

The transparent cover can be incorporated in existing instruments as a replacement for the original coverglass. Incorporation of the transparent cover in a new instrument will simplify design in that provision does not have to be made for mounting the plurality of electric bulbs or any means for directing light from the bulbs on to desired areas of the dial, thereby reducing costs. Furthermore, the weight and space envelope of an instrument incorporating the transparent cover 10 will be reduced compared to a similar instrument having an electric bulb illumination system.

Being a sealed assembly, the transparent cover 10 requires minimal maintenance attention, and, providing the electrical contacts are not broken, complete failure is extremely unlikely thereby eliminating a need for standby or secondary circuits. It should also be noted that, in the unlikely event of a failure, the transparent cover is easily replaceable in the instrument thereby considerably reducing maintenance requirements.

The transparent cover is highly resistant to damage either by inertia shocks or vibration, making it ideally suited for incorporation in instruments for use in industrial, marine, aircraft or military applications.

The electrical current consumption of the electroluminescent area(s) in a transparent cover (with an electrical supply of 115 volts, 400 Hz) is about 0.15 milliampere per square centimeter. In a typical annular electroluminescent area for a transparent cover of 7 centimeter diameter, the width of the electroluminescent area is 2 millimeters, giving an area of 4.4 square centimeters. At 115 volts supply, this consumes an electrical power of only 0.07 watts, i.e. only about 1.4 percent of the power that may be used in a comparable instrument illuminated by electric bulbs. Such a small power consumption results in a negligible heat output from the cover thereby eliminating the heat dissipation problems of bulb lit instruments and also a potential fire hazard.

The brightness of the light output from the electroluminescent area(s) in the transparent cover at 115 V, 400 Hz electrical supply is 5 foot lamberts. Whilst efficiency will decrease with operating time, it is to be noted that brightness after 10,000 operating hours is still about 1.1 foot lamberts that is more than adequate to provide efficient dial illumination. Negligible degradation occurs when the electroluminescent areas are de-energised and the number of switching operations does not affect the total life.

Such an operational life expectancy as is mentioned above, is far in excess of that normally obtained by electric bulb illumination means, and is another important feature in reducing maintenance activity and therefore operating costs.

Due to the low current requirement of the transparent cover of the invention, the creation of electromagnetic fields is negligible and, consequently, radio interference or detrimental effects on delicate magnetically dependant equipment is unlikely to occur.

The colour of the light emitted by the energised electroluminescent area(s) in the transparent cover 10 will depend on the properties of the particular phosphor material used in its construction.

In the embodiment previously described, the transparent conducting layer(s) are provided on an inner surface of one only of the glass laminates. This arrangement simplifies construction of the transparent cover and reduces costs.

Whilst two embodiments of the invention have been described and illustrated, it will be understood that many modifications can be made without departing from the scope of the invention as defined in the appended claims. For instance, the laminates 15 and 16 may be of other suitable material such as a transparent plastics material. Edge connectors may be used to connect the electrical leads to the electroluminescent area(s) in place of the soldered connections. Other suitable materials than those specified may be used in the construction of the electroluminescent area(s), and these may be arranged in any desired position and shape in the transparent cover to provide efficient illumination of desired portion(s) of the dial. The transparent cover need not be flat and may be either concave or convex in respect of the instrument. Similarly, the cover may be of other external shapes such as oval or rectangular to suit any particular instrument in which it is to be fitted. The transparent cover can be operated from alternative electrical supplies to that hereinbefore quoted, although to provide efficient illumination these should be within the ranges of 115 to 400 V and 50 to 500 Hz.

We claim as our invention:

1. A transparent coverglass adapted to be fitted to an instrument above a dial on the instrument to enable legends or characters on the dial to be viewed externally of the instrument, said coverglass comprising a pair of transparent laminates and an electroluminescent area sandwiched between the laminates, the electroluminescent area occupying a relatively small portion of the area between the transparent laminates to provide a viewing window through the major portion of the area, and transparent adhesive securing the laminates together with the electroluminescent area therein to form a unitary coverglass sandwich with spaced apart transparent laminates to be fitted to an instrument, said electroluminescent area comprising a plurality of layers disposed in adjacency and including a first electrode layer of transparent electrically conductive metal oxide film, said first electrode layer being applied to an inner surface of one of said laminates, a layer of light emitting phosphor, an insulating layer and a second electrode layer, said second layer comprising a copper film applied to said insulating layer, and means for connecting said electroluminescent area to an electrical supply so that, when energised, light is projected from an inner surface of the coverglass to illuminate at least part of a dial of an instrument on which the coverglass is fitted through the inner one of said transparent laminates and the illuminated dial is viewable through both the inner and outer transparent laminates.

2. A transparent coverglass as claimed in claim 1, wherein said electroluminescent area is an annular area located adjacent the periphery of the coverglass.

3. A transparent coverglass as claimed in claim 2, wherein a copper film strip is connected to said first electrode layer and extends into a gap in said second electrode layer so that edges of the strip are spaced-apart from edges defining the gap in said second electrode layer.

4. A transparent coverglass as claimed in claim 3, wherein electrical flying leads are soldered to the copper film strip and the copper film, and are arranged for connection to an electrical supply to energise said first and second electrode layers.

5. A transparent coverglass as claimed in claim 4, wherein said electroluminescent area includes a further area located within said annular area, said first electrode layer of said annular area being common to both said areas, a second electrode layer of said further area being connected through a transparent electrically conductive film strip applied to the inner surface of said one of said laminates to a further copper film strip extending into a second gap in said second electrode layer of said annular area so that edges of the further copper film strip are spaced-apart from edges defining the second gap in said second electrode layer.

6. A transparent coverglass as claimed in claim 5, wherein an electrical flying lead is soldered to said further copper film strip and arranged for connection to an electrical supply to energise the second electrode layer of said further area.

7. A transparent coverglass as claimed in claim 5, wherein said transparent electrically conductive film strip is located in a gap in the transparent electrically conductive film forming said first electrode layer and is spaced-apart from edges defining the gap in said first electrode layer.

8. An instrument including a dial and a transparent coverglass according to claim 1 fitted over said dial whereby light is projected onto the dial.

* * * * *